United States Patent [19]
Hoss et al.

[11] Patent Number: 5,551,759
[45] Date of Patent: Sep. 3, 1996

[54] DUAL USE MATERIALS TRANSPORT VEHICLE WITH BELLY-DUMPING AND IMPROVED END-DUMPING CAPABILITIES AND METHOD OF CONSTRUCTION

[75] Inventors: Gregg M. Hoss, Bedford; James E. Thompson, Ft. Worth; Thomas F. Johnson, Uvalde; Martin Kirbie, Grand Prairie; Andrew J. Speer, III, Arlington, all of Tex.

[73] Assignee: JHC Ventures, L.P., Irving, Tex.

[21] Appl. No.: 392,630

[22] Filed: Feb. 22, 1995

[51] Int. Cl.⁶ .................................................. B60P 1/16
[52] U.S. Cl. .......................... 298/22 P; 296/181; 298/7; 298/17.5; 298/27
[58] Field of Search ................ 193/5; 296/181, 296/184, 205; 298/7, 17.5, 17.8; 27/22 P

[56] References Cited

U.S. PATENT DOCUMENTS

| | | | |
|---|---|---|---|
| 2,752,193 | 6/1956 | Kling | 298/22 P |
| 2,803,491 | 8/1957 | Brown | 298/7 |
| 2,878,053 | 3/1959 | Yuncker | 298/7 |
| 3,232,666 | 2/1966 | Hutchinson. | |
| 3,907,364 | 9/1975 | Hnath | 298/17.5 |
| 4,289,353 | 9/1981 | Merritt | 298/17.5 |
| 4,527,939 | 7/1985 | Suarez | 414/382 |
| 4,541,517 | 9/1985 | O'Reilly | 298/7 |
| 4,557,400 | 12/1985 | Clarke | 296/181 |
| 4,573,850 | 3/1986 | Suarez | 414/382 |
| 4,576,398 | 3/1986 | Kinne | 280/789 |
| 4,883,321 | 11/1989 | Voigt | 298/27 X |
| 4,948,324 | 8/1990 | Niederer | 414/415 |
| 5,006,039 | 4/1991 | Niederer | 414/786 |
| 5,242,185 | 9/1993 | Carr et al. | 296/181 |
| 5,244,069 | 9/1993 | Cosgrove | 193/5 |
| 5,344,271 | 9/1994 | Bratlie et al. | 298/7 |

*Primary Examiner*—Karen B. Merritt
*Assistant Examiner*—Janice L. Krizek
*Attorney, Agent, or Firm*—John W. Montgomery; Ross, Clapp, Korn & Montgomery, L.L.P.

[57] ABSTRACT

A dual use belly-dumping and end-dumping vehicle includes a frame mounted on wheels for transport and a pivotable hopper carried in the frame. A lower pivot element is mounted to the frame with a corresponding lower pivot engaging element mounted on the hopper. An upper pivot element is also mounted on the frame with a corresponding upper pivot engaging element mounted on the hopper. Lifting cylinders are mounted between sides of the frame and sides of the hopper for pivoting the hopper at the lower pivot element between a horizontally held position and a first angled position at which the hopper is disengaged from the lower pivoted element and engaged at the upper pivot element so that it is pivoted to a second angled position for dumping materials from the end of the hopper.

15 Claims, 7 Drawing Sheets

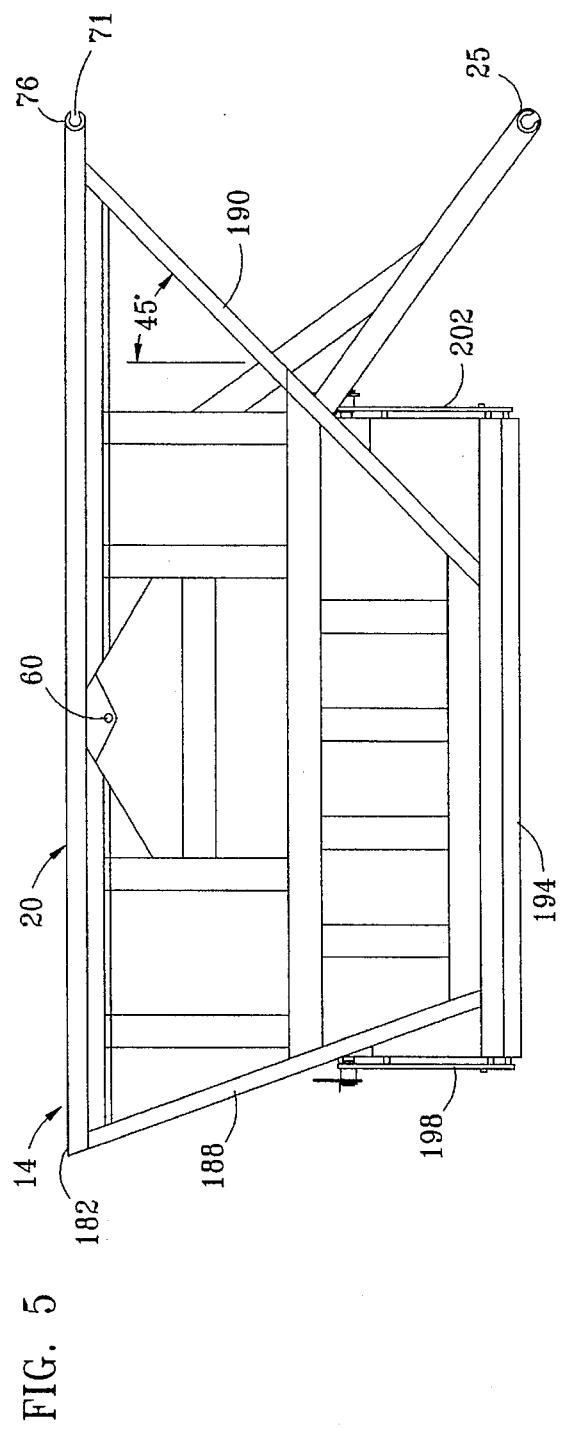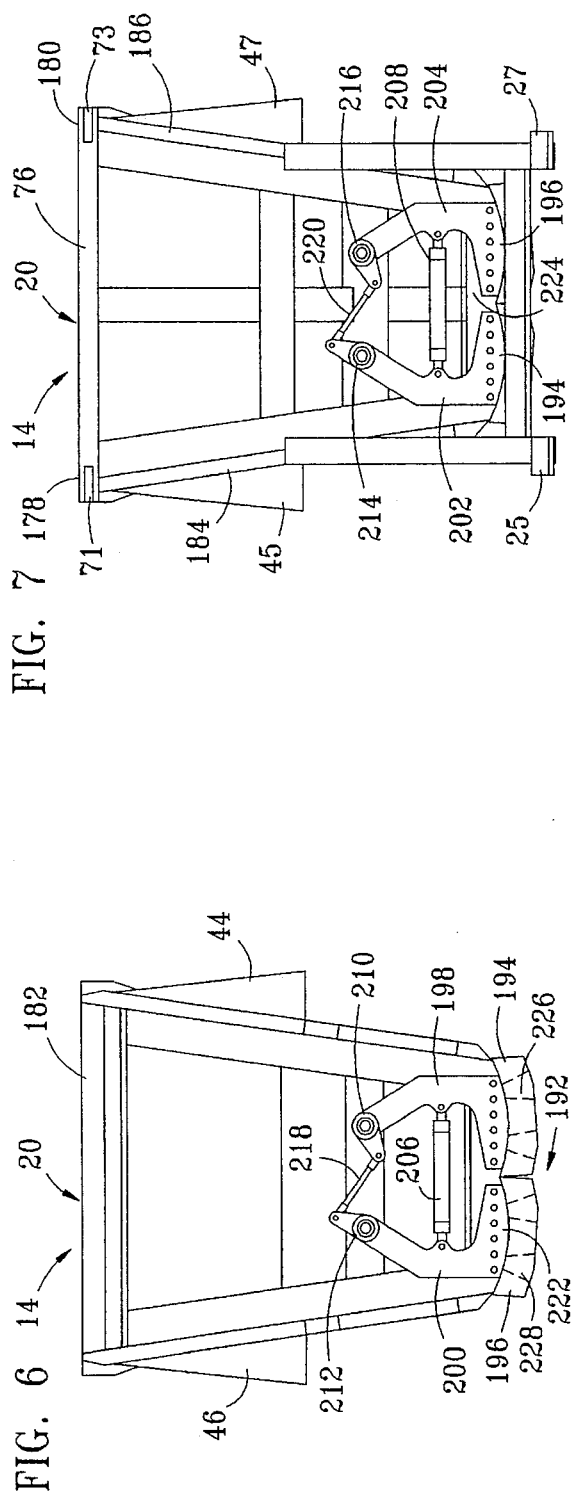

DUAL USE MATERIALS TRANSPORT VEHICLE WITH BELLY-DUMPING AND IMPROVED END-DUMPING CAPABILITIES AND METHOD OF CONSTRUCTION

TECHNICAL FIELD OF THE INVENTION

The present invention relates to a dual use vehicle having capabilities of transporting materials in a hopper from which the materials may be dumped from the bottom of the hopper or dumped from the end of the trailer, and particularly to a dual use trailer with improved end dumping capabilities.

BACKGROUND OF THE INVENTION

In the past, vehicles for the purpose of transporting sand, gravel, paving materials and other loose materials which are relatively heavy have often been required to be specialized, either for the type of materials which must be carried or for the particular conditions under which the vehicles must operate. Many vehicles are primarily used in general construction for conveying, moving or delivering large quantities of sand, concrete, rocks, earth or paving materials. Often, large quantities of materials must be transported long distances over existing roadways. Depending upon the particular application, the transported materials may need to be dumped from the belly of the vehicle. Sometimes, vehicles may be required which allow the materials to be dumped from the end of the vehicle. In the past, vehicles which dumped from the belly typically required one specific type of construction. Other vehicles which dumped from the end, as by raising the front end of a truck bed and letting the contents slide through a tailgate, required a different type of construction.

Some types of work or construction may have enough use for a particular specialized dumping activity to justify constructing a particular type of vehicle for the intended purpose, whether belly dumping or end dumping. Other jobs may require more than one specialized dumping capability. Often, there is a need to have one or only a few transport and dumping vehicles which might be useful for multiple purposes. Typically, trailers and vehicles are available only for one particular purpose, as, for example, the end-dumping trailers shown in U.S. Pat. Nos. 2,718,429; 2,983,548; and 3,232,666. However, these various types of end-dumping vehicles are entirely without belly-dumping capabilities. Belly-dumping vehicles have also been known; however, such vehicles typically are highly specialized for the particular belly-dumping operation intended, without end-dumping capabilities.

An early attempt to overcome the drawbacks of separate vehicles for specialized purposes included a combination belly-dump/end-dump vehicle for hauling materials, which was disclosed in U.S. Pat. No. 4,289,353. This disclosure showed a vehicle which was intended to be capable of either end dumping or belly dumping. The disclosure showed a vehicle, which included a frame mounted upon wheels and which provided a first pivot support and a second pivot support, with the first pivot support at least level with or lower than the second pivot support. A hopper for containing the materials to be transported and dumped was carried by the frame. The hopper was described as having a gate means located at the bottom for belly dumping. In its lowered or transport position, an arm from the rear of the hopper engaged the first pivot support. A telescopic ram was provided between the front of the frame and the front of the hopper for raising the front end of the hopper and for lifting the hopper rotatably about the first pivot support. After pivoting to a particular angle and before dumping was initiated, a top edge of the hopper became pivotably engaged with the second pivot support. The first and second pivots were alternately engaged upon hydraulically raising the front end of the hopper so that the materials dumped out of the rear of the hopper over the rear of the frame, preferably only after the second pivot engagement occurred. The vehicle disclosed provided the first pivot support ahead of the rear wheels. The second pivot support was shown positioned behind the rear wheels of the vehicle to permit dumping the contents behind the vehicle, not on the frame or rear wheels. Thus, unless the trailer vehicle was securely attached downward in the front, a heavy load in a fully tilted hopper acted downward on a "lever" extending behind the rear axle and could cause a tendency to lift the front end of the trailer. Also, the telescopic hydraulic cylinder was attached ahead of the hopper, apparently for maximum leverage when pivoting the hopper. This construction required an extremely long hydraulic cylinder stroke to fully pivot the hopper. A hydraulic cylinder with a large number of telescoping hydraulic stages would be required for a vehicle with this design. Also, the frame for the vehicle, as disclosed, was of a construction requiring multiple side beams extending from the front to the rear of the vehicle along the sides of the hopper to be supported. Upper and lower parallel side beams were provided on each side of the hopper, apparently to provide adequate strength and stability for a fully loaded hopper.

Further, the alternatingly engageable pivot support connections were depicted as including round bar stock pivot bars attached to the hopper and semicircular sockets secured, upwardly directed, on the vehicle for pivotably receiving the pivot bars of the hopper. These upwardly directed sockets did not hold the hopper downward in place when transporting. The weight of the hopper and payload and the hydraulic cylinder attachment were relied upon for holding the hopper down into the frame during transport. Further, when the hopper pivot bars were not engaged in the upwardly opened pivot sockets, the sockets could accumulate rocks, gravel or other materials, as, for example, from loading or unloading the payload. Thus, the lower pivot supports or sockets could accumulate debris when the hopper was pivoted rearward and engaged in the upper pivot sockets for end dumping. The upper sockets could accumulate debris when the hopper is in its lowered/non-pivoted position. When the pivot bars engaged and rotated in the sockets, unnecessary wear and abrasion resulted.

SUMMARY OF THE INVENTION

These and other deficiencies and of the prior transport and dumping vehicles and trailers are overcome and other advantages are provided by the invention of an improved dual use belly- and end-dumping vehicle. In particular, a unique frame construction is provided, including an open frame concept using streamlined, low profile, improved strength, parallel box beams to support the hopper. Support struts are welded at spaced-apart locations along the interior of each box beam to provide additional stability, so that only one beam is required on each side of the frame. A particular advantageously strong construction has been found to result from alternatingly welding interdigitated vertical support struts along the left inside and then the right inside of each box beam.

Another aspect of the present invention is to provide two side-mounted hydraulic cylinders, which act in parallel and which are strategically positioned with respect to the dimensions of a particular vehicle or trailer for providing both an adequate lifting force and also an acceptably short cylinder stroke. In particular, shortening the cylinder stroke allows the use of telescopic hydraulic cylinders with a reduced number of stages. This facilitates the use of two pivot points for end dumping, while providing maximum stability, strength and lifting force in the cylinders because of the reduced number of cylinder extension stages required for the parallel telescopic hydraulic cylinders.

Another aspect of the invention is the use of an angled rear chute for effectively moving the end-dumped materials past the end of the trailer. By using the angled chute, the second pivot point may be advantageously positioned ahead of the rearmost wheels. The rear chute carries dumped materials past the rearmost wheels for unobstructed dumping behind the trailer. The pivot point ahead of the rearmost wheels avoids undesired tipping or lifting of the front of the vehicle. Further, the rear chute is advantageously provided with a high temperature resistant, reduced wear and reduced friction, plastic sheet material which facilitates smooth dumping and is particularly useful for dumping sticky materials, such as asphalt, concrete or other sticky aggregate materials. Advantageously, the sheet of plastic can be removably attached for convenient replacement.

An additional advantageous feature of the invention is in the use of guide baffles within the rear interior of the hopper for purposes of directing discharged materials for smooth flow out of the end dumping chute. This feature has been found to be particularly advantageous in connection with dumping sticky materials, such as hot asphalt or aggregate material. The guide baffles reduce clumping of the materials, and particularly sticky materials, such as asphalt, as they are dumped, so that a smooth layer of asphalt or other sticky materials may be accomplished with the end-dumping feature of the dual-use trailer, according to the present invention.

BRIEF DESCRIPTION OF THE DRAWINGS

The foregoing objects, advantages, and features, as well as other objects and advantages, will become more apparent with reference to the description and drawings below, in which like numerals represent like elements and in which:

FIG. 5 is a side view of a belly-dumping and end-dumping hopper removed from the trailer frame;

FIG. 6 is a front elevation view of the hopper of FIG. 5.

FIG. 7 is a rear elevation view of the hopper of FIGS. 5 and 6.

DETAILED DESCRIPTION OF THE PREFERRED EMBODIMENTS

Figure 1:
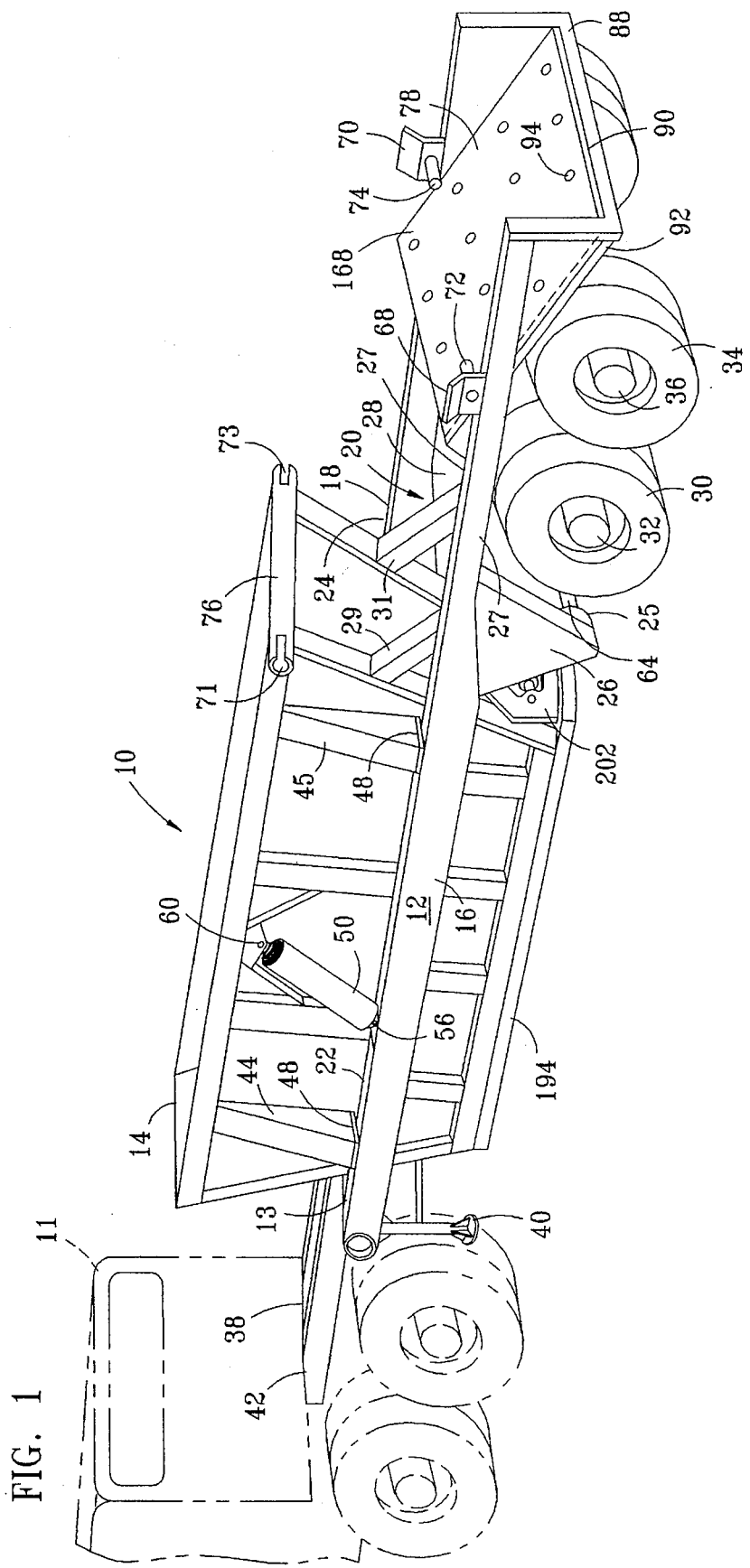
FIG. 1 is a side perspective view of an improved dual use bottom and end dumping trailer shown with the hopper in the secured, or bottom-dumping, position according to the present invention.

FIG. 1 shows a side perspective view of a materials transporting vehicle 10 having dual dumping capabilities, including bottom dumping and end dumping. The vehicle includes a frame 12, which is constructed for carrying a hopper 14 in which transported materials, such as gravel, sand, asphalt and other heavy materials, which exhibit some of the characteristics of fluid material in that they may be dumped or may flow either from the bottom bay doors of the hopper or from the end of a tipped hopper. The frame 12 may, for example, be constructed as a self-powered vehicle (not shown) or, preferably, may be advantageously constructed in the form of a semitrailer 13 which may be pulled with a truck tractor 11 (shown in phantom). This allows for the dual-use vehicle 10 to be formed with any standard trucking rig without requiring self-motorization.

The frame 12 includes a left-side frame 16 and a right-side frame 18. It will be noted that "left" and "right", as used herein, will be adopted according to the convention of a forward moving vehicle, viewing the vehicle from the rear so that the observer's left becomes the vehicle's left and the observer's right becomes the vehicle's right. Unless otherwise indicated, the vehicle 10, frame 12 or semitrailer 13 are typically bilaterally symmetrical so that the right side is a mirror image of the left side. A hopper receiving opening 20 is formed between the left- and right-side frames. A left-side hopper support surface 22 and a right-side hopper support surface 24 are, according to the embodiment depicted, provided by the tops of left- and right-side frames 16 and 18. A left lower pivot support 26 and right lower pivot support 28 (only partially shown in FIG. 1) are rigidly attached to and extend below side frames 16 and 18, respectively. As depicted, a first set of rear wheels 30 are mounted along a first rear axle 32, with an additional set of wheels 34 mounted along an additional axle 36. While the number of wheels depicted includes four wheels on each of two axles 32 and 36, it will be understood that this is consistent with standard eighteen-wheel tractor and semitrailer rig construction. The number of rear wheels on a vehicle 10 or on a semitrailer 13 may be varied according to the length of frame 12 and load carrying requirements. However, significant advantageous aspects of the location of the rear wheels with respect to hopper pivot points will be discussed more fully, below. In the embodiment shown, there is a trailer tongue 38, which may be supported at the front end of the trailer off of the ground with left and right legs or landing gear 40 and 41. The tongue 38 may also include a hitch or "fifth wheel" 42 by which the trailer is attached to a truck 11.

The hopper 14 is positioned in opening 20 between the left- and right-hand frame members 16 and 18. The frame members 16 and 18 provide support surfaces 22 and 24 against which front and rear left hopper support arms 44 and 45 on the left and front and rear right hopper support arms 46 and 47 (not shown in FIG. 1) on the right. Support arms 44, 45, 46 and 47 are advantageously positioned spaced-apart toward each corner of the hopper so that a stable transport is achieved. Further advantageously, layers of shock absorbing material 48 may be interposed between support arms 44 and 45 and support surface 22 and also between support arms 46 and 47 and support surface 24 on the other side, such as sheets of hard rubber. Also attached between the frame 12 and the hopper 14 are lifting devices 50 and 52 and, preferably, concurrently actuatable hydraulic cylinders 50 on the left and 52 on the right (52 not shown in FIG. 1) See FIG. 3. The hydraulic cylinders 50 and 52 are advantageously attached to the left frame 16 at a left partially rotatable attachment 56 and at a right partially rotatable attachment 58 (again, not shown in FIG. 1—see FIG. 3). The left and right partially rotatable attachments 56 and 58 may advantageously comprise clevis and pin or pin and eyelet arrangements 56 on the left and 58 on the right. Similarly, left cylinder 50 and right cylinder 52 are attached to the hopper at left partially rotatable hopper attachment 60 and right partially rotatable hopper attachment 62, which may also be clevis and pin or pin and eyelet arrangements to allow each cylinder to partially rotate at either end about an axis which is parallel to the hopper pivot axis formed by an imaginary line between left pivot element 64 and right pivot element 66, which are attached to the frame 12 through left lower pivot support 26 and right lower pivot support 28.

The left and right lower pivot supports 26 and 28, respectively, may, according to one embodiment, attach sockets into which hopper-mounted pivot bars may be inserted (not shown). However, in a preferred embodiment, left and right pivot supports 26 and 28, respectively, mount lower pivot bars 64 and 66, projecting horizontally inward from the respective pivot supports. Corresponding lower pivot sockets 25 and 27 are secured to the hopper 14 for rotatably engaging the lower pivot bars 64 and 66. The lower pivot sockets are attached to lower pivot legs 29 and 31, which are rigidly affixed to the hopper 14.

In operation, the hydraulic cylinders 50 and 52 are actuated simultaneously, in parallel to lower pivot elements 64 and 66, mounted on the hopper 14 about pivot supports 26 and 28 until upper pivot elements 72 and 74 mounted on supports 68 on the left and 70 on the right become engaged with corresponding hopper upper pivot elements 71 and 73 at the rear upper edge 76 of hopper 14. As the hydraulic cylinders 50 and 52 are actuated further in extension, the pivot axis is transferred from the lower pivot to the upper pivot elements 72 and 74. In the preferred embodiment, the lower pivot bars 64 and 66 become disengaged from lower hopper pivot sockets 25 and 27. Materials carried within the hopper 14 are then poured out of the hopper by the force of gravity over tear edge 76 and are further guided with rear chute 78 over the end 88 of trailer 13 and out beyond and, preferably, downward at an angle out beyond the rearmost set of wheels 34. This operation will be explained more fully, below; however, it should be noted that the position of left upper pilot support 68 and right upper pivot support 70 are advantageously positioned ahead of the rearmost set of wheels 34, with the rear chute 78 advantageously directing the materials being dumped beyond the rearmost wheels 34. This positioning avoids the rearmost axle 36 acting as a fulcrum about which the trailer 13 pivots because of the weight of the hopper and payload. Where the upper pivot axis is behind the rearmost axle, the weight of the pivoting hopper might tend to lift the front of the trailer. Instead, with the advantageous construction disclosed here, the weight is borne by the wheels and axles without causing the trailer to tip.

Figure 2:
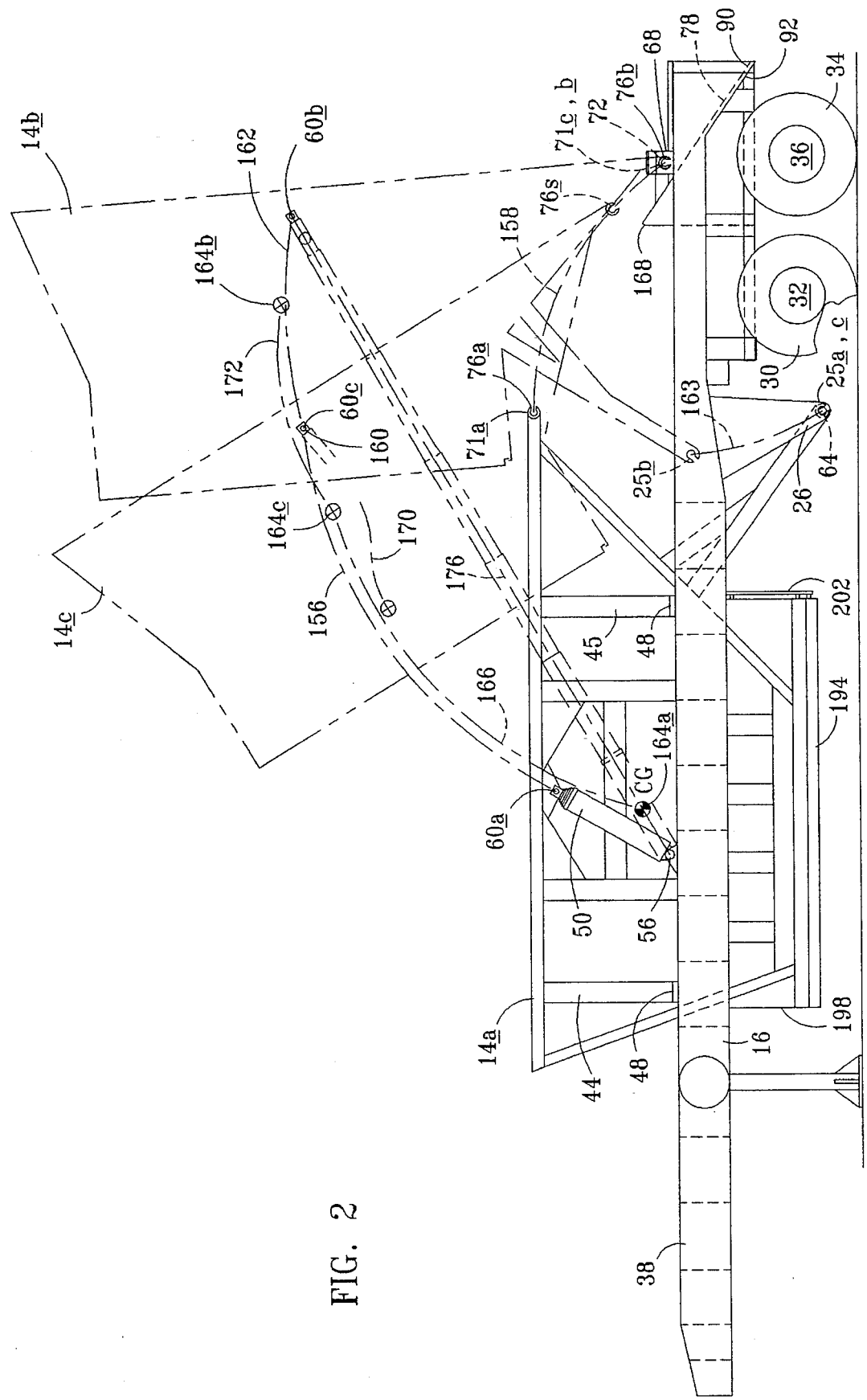
FIG. 2 is a side view of an improved dual use bottom and end dumping trailer shown with a hopper in its transport position and showing (in phantom) the hopper pivoted upward into an end dumping position according to the present invention.

FIG. 2 is a schematic side pan view of an improved dual use belly- and end-dumping trailer, shown in solid lines, with its hopper in a horizontal transport position and showing in phantom lines the hopper pivoted upward into an end-dumping position. In this schematic embodiment, the designation of a given element in its horizontal or transport hopper position is designated with the number of the element number and the letter "a", the hopper pivot transition position of a given element is designated with the element number and the letter "c", and the hopper pivoted upward position of an element is designated with the element number and the letter "b". In this schematic depiction, it will be observed that initially, hopper 14 is in a horizontal position, with socket 25a on the hopper assembly pivotably engaged with lower pivot rod bar 64 on the left side. It will be understood, with reference to FIGS. 3 and 7, that hopper socket 27 will be similarly pivotably engaged with pivot bar 66 on the right side. As cylinders 50 and 52 are actuated, hopper rotatable connection point 60 moves in an arc, depicted at 156, from position at 60a to position at 60c, with the center of arc 156 at the axis of bars 64 and 66 as the center point of the arc 156. Upper hopper connection socket 71 moves in an arc 158, which also has as its center the axis of lower pivot rods 64 and 66. Upper socket at 71a is positioned, relative to socket 25a, a distance which is equal to the distance between lower pivot bar 64 and upper pivot bar 72. Thus, as 71 traverses the arcuate path 158, from 71a to 71c and 71b, it will engage with upper pivot bar 72 after a predetermined amount of rotation. In the embodiment shown, approximately a 50° rotation occurs before 71 engages with bar 72, and it remains engaged until fully pivoted, as depicted in phantom lines at 71b. At this point in time, hopper to cylinder connection 60 will have moved to an imaginary transition point 60c along arcuate path 156. Upper pivot bars 72 and 74 (74 not shown in FIG. 2) see FIG. 3 form a new upper pivot axis, and lower pivot socket 25, at the transition position 25c, begins to disengage from pivot bar 64. Similarly, left lower pivot socket 27, at the transitional position 25c, begins disengaging from pivot bar 66. As the cylinder 50 continues to be actuated in extension, the hopper connections 60 and 62 move in an imaginary arcuate path 162 about the center of the axis between upper pivot bars 72 and 74. Lower hopper socket 25 moves in an arcuate path 163 to the fully tilted position 25b, the arcuate path 163 has as its center, the axis between upper pivot bars 72 and 74.

It has been found that during this operation of the improved rear-dumping vehicle, materials within hopper 14 will, at a certain point, begin to spill over its rear edge 76. Also, it has been found that with a fully loaded hopper 14, the center of gravity will be approximately midway between the upper edge and the belly and approximately midway from the front wall to the rear wall, such as at the imaginary circle designated 164a in the initial horizontal transport position. The center of gravity 164a will initially move along an arcuate path 166, having as its center point the center axis between bars 64 and 66. This path 166 of the center of gravity will continue to be arcuate until the pivoting is sufficiently steep that the contents begin to shift within hopper 14. In the case of a liquid, this would begin almost immediately so that the liquid would remain level at the top. However, in the case of solid, granular material, such as sand, gravel, grain or other similar solid, granular material, a certain amount of resistance to movement will prevent immediate shifting. Thus, it has been found that for construction materials, such as sand and gravel, shifting of the center of gravity and movement of the contents will begin between about 20° and 40° of pivoting. With a normally loaded hopper, the contents can begin to spill over the edge 76 after about 40° of pivotable rotation. Thus, the rear-angled chute 78 advantageously extends to a front edge 168, forward of the upper pivot bars 72 and 74, and, preferably, the angled chute 78 extends forward of a point 76s along the arcuate path 158, which corresponds to the initial spillage of the type of material to be carried in the hopper, so that any initially spilled material lands on the front edge 168 of angled chute 78. Thus, the chute 78 guides poured materials, even in situations where the flow begins before engagement of upper socket pivots 71 and 73, with upper pivot bars 72 and 74.

Also, because the center of gravity typically begins shifting, with shifting of the contents of hopper 14 even before the hydraulic cylinder reaches transition point 60c, the center of gravity 164 follows an imaginary path approximately as depicted at 170. It is noted that if the center of gravity did not shift, it would follow the imaginary path as depicted at 172. Thus, the positioning of hydraulic cylinder 50 at partially rotatable connections 56 and 60 (and positioning of hydraulic cylinder 52 at 58 and 62) is carefully selected to provide a sufficiently long lever arm for the force of the cylinders to overcome the weight of the hopper acting through the horizontal leverage distance from the center of gravity 164 to the pivot point 64. Because the center of gravity 164 moves toward the pivot point along path 166, the leverage distance of the center of gravity 164 continuously decreases. With cylinders 50 advantageously positioned at 90° to the leverage distance from 64 to 60a, the cylinders' leverage does not decrease until after reaching transition point 60c along path 156, when the cylinder leverage is approximately the distance from 72 to 60c. This transition point is near or beyond the pivot point 64, measured horizontally, so that the center of gravity 164 moves to within a short horizontal distance of pivot point 64. The moment arm for the weight of the hopper is relatively small. At that point, the hopper 14 is being moved substantially horizontally, as determined by a tangent to arc 166 at point 164c, which corresponds to the center of gravity at the transition point 71c where socket 71 engages pivot point 72 and the pivoting then begins to be about pivot point 72. At this point, the leverage of the hopper's center of gravity is determined by horizontal distance from point 164c to pivot point 72, which is, in the preferred embodiment, less than the effective leverage distance for the cylinder, as determined by the distance from pivot point 72 and transition point 60c for the upper rotatable attachment of cylinder 50 to the hopper 14. Transition point 60c is reached at the moment that the socket 71 engages with upper pivot bar 72. Of course, as the carried payload material begins to shift within the hopper, and especially if a portion of it begins to spill, the center of gravity tends to move horizontally toward pivot point 72 quite rapidly. Thus, the total, fully extended stroke of cylinder 50—and, therefore, the number of stages required for cylinder 50—can be minimized by positioning cylinder 50 and also corresponding cylinder 52 at the sides of the hopper and, preferably, at an angle of about 90°, as measured between rotatable connection point 56 and 62 and rotatable connection point 62 and pivot point 64. This maximizes the leverage where pivoting of the hopper is initiated and the angle decreases only slightly as the hopper rotates along path 156 until transition point 160 is reached, at which point the angle between the cylinder axis 176 and rotatable connection point 60c and upper pivot point 72 is again about 90°, thereby maximizing the advantage of the cylinder 50 when it begins rotating the hopper about rotation point 72. Thus, a preferred balance between the length of cylinder 50, the number of stages and the lifting force required in cylinder 50 is advantageously achieved by positioning connection point 56 at a point which is a short horizontal distance forward of the hopper center of gravity 164. More than five stages could be used, but five or fewer stages are preferred. The rotatable connection point 60 will be at a point substantially even with or a short horizontal distance behind the center of gravity 164.

Figure 3:
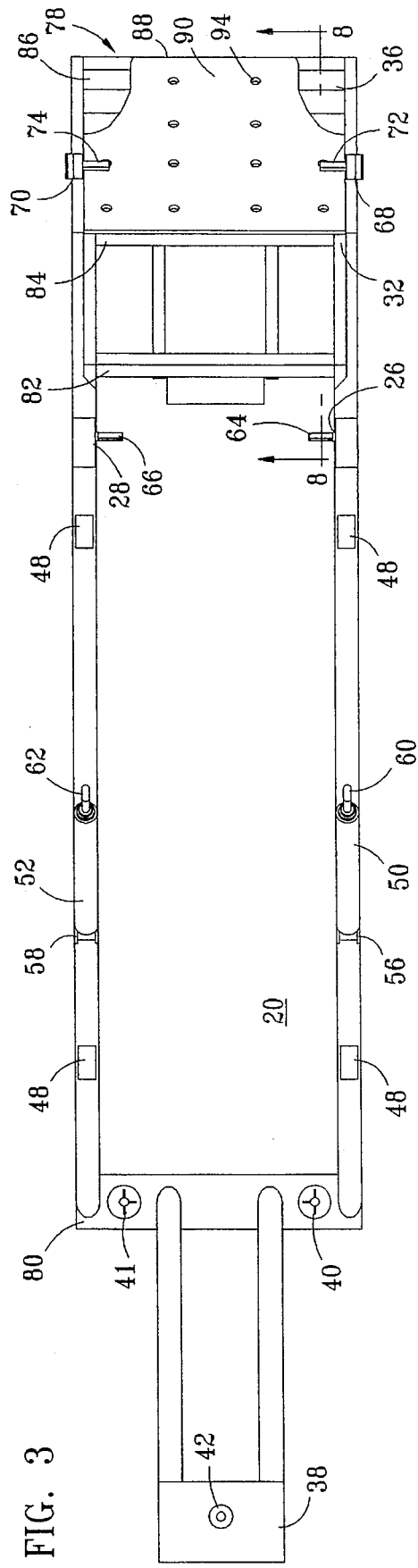
FIG. 3 is a top plan view of an open box trailer frame construction of the vehicle of FIG. 1, having the hopper removed.

FIG. 3 is a top plan view of the vehicle frame 12 (in this particular embodiment, frame 12 of a trailer 13 is depicted), in which the foregoing construction and also additional construction of front cross beam 76 and rear cross beam 82 are depicted. Frame 12, therefore, borders the open area 20. Additional rear cross beams 84 also advantageously hold the rear of the frame together and provide support for axles 32 and 36. An end beam 86 provides strength to the rear edge 88 of chute 78. Chute 78 may be advantageously provided with a smooth, low-friction surface 90, which may, in a preferred embodiment, comprise a plastic sheet cover 90, which is attached to a structural rear chute support 92, which may be an angled plate of steel attached to the frame 12. Attachment fasteners 94 secure the plastic sheet cover 90 to chute support 92. The attachment fasteners 94 may be large, flathead screws or bolts which securely hold the plastic sheet cover 90 in a relatively flat and secure position to form a sliding surface at the bottom of an angled chute 78, as described above. The attachment fasteners 94 are, preferably, removable to allow the rear chute cover 90 to be removed and replaced as abrasion and wear occurs. The underlying support plate 92 will remain intact, without degradation. In a preferred embodiment, sides of chute 92 and also the interior surfaces of hopper 14 may also be covered with an abrasion-resistant, reduced friction plastic material. Particularly, the rear hopper wall 190 might be advantageously covered with such a plastic sheet material. Such a plastic covering, which is also heat-resistant, is particularly advantageous in situations where hot asphalt or other hot, sticky composite or aggregate materials may be used.

Figure 4:
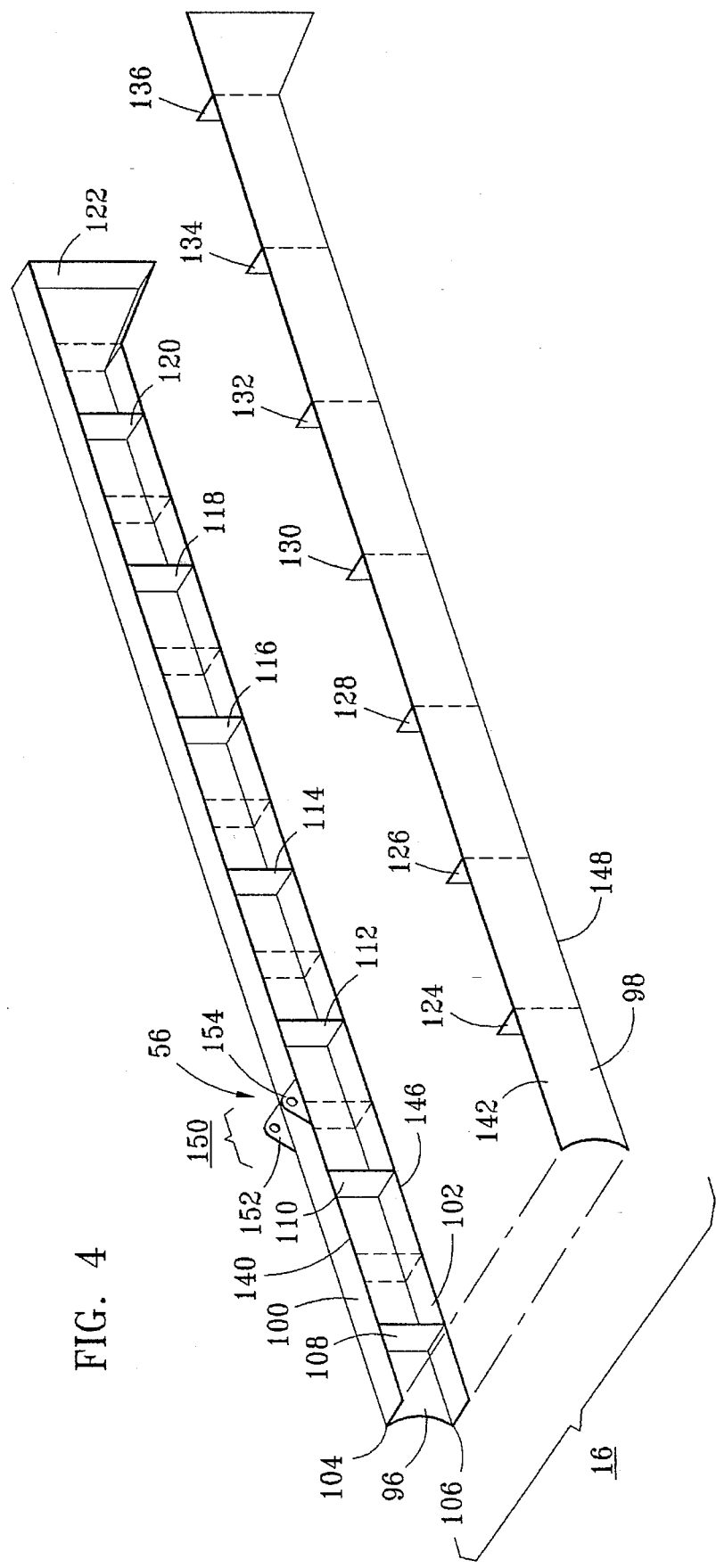
FIG. 4 is a schematic partial assembly view of one side support member of the trailer frame, uniquely constructed for withstanding significant forces required for pivoting a filled hopper into an end dumping position according to the present invention.

In the preferred embodiment, the frame members 16 and 18 are advantageously constructed as box beams having top plates, bottom plates and side plates. The details of construction of the box beams, according to the present invention, will be more fully understood with reference to FIG. 4, which is a schematic perspective view of a preferred embodiment of the left box beam 16. It will be understood that similar construction is preferred for a right box beam 18. In the embodiment depicted in FIG. 4, the box beam may advantageously be constructed of a first side plate 96 and a second side plate 98, having a top plate 100 and a bottom plate 102. In the preferred embodiment, the top plate 100 is welded to the first side beam 96 at a 90° angle with respect to plate 96. Although the stucture can be welded with the side plates in the vertical position, as shown, a fixture can also be advantageously used in which top plate 100 and side plate 96 are each angled at approximately 45° with respect to vertical during welding (not shown). A continuous bead of weld is made along the length of the beam at corner 104. The 45° angle of each plate causes the weld to advantageously flow, by the force of gravity, relatively evenly into both top plate 100 and side plate 96. Similarly, bottom plate 102 is also welded at a 90° angle to first side plate 96, and both are held, for welding purposes, angled at approximately 45° from vertical (not shown), so that the weld along corner 106 flows relatively evenly by the force of gravity into both side plate 96 and bottom plate 102. It is desirable to have spaced-apart support struts on the interior of the constructed box beam 16. It has been found to be further advantageous to have a plurality of support struts 108, 110, 112, 114, 116, 118 and 120 within plate 122, each rigidly welded to side plate 96 and also to the inside of top plate 100 and the inside of bottom plate 102. Alternatingly interposed with the support struts securely welded to side plate 96 is another plurality of support struts 124, 126, 128, 130, 132, 134 and 136, each securely welded vertically to side plate 98, preferably at spaced-apart regular intervals for interdigitated insertion between the support struts, which are welded to first side 96. Second side plate 98 is positioned adjacent to first side 96, with the support struts interdigitatedly interposed, and the entire assembly is desirably held in a fixture so that top plate 100 and second side plate 98 are angularly disposed at 45° from vertical, and a weld is applied all of the way along the junction of edge 140 on top plate 100 and edge 142 on second side plate 98. The entire assembly is then rotated approximately 90°, so that side plate 98 and bottom plate 102 are also positioned each at 45° from vertical, and a weld is applied therealong between edge 146 of bottom plate 102 and edge 148 of second side plate 98. The right side frame 18 is similarly advantageously constructed as a box beam 18 is a fashion substantially the same as with box beam 16, shown in FIG. 4. Both box beams 16 and 18 are then attached by welding to a front cross beam 80 and to rear cross beam 82 to additional rear cross beam 84 and to end beam 86 to form the main body of the frame. The tongue 38 is attached, as by welding, to the front cross beam 80, and other attachments, such as pivot supports and rear axle suspension, can be attached by welding or bolting to form a frame assembly.

The left, partially rotatable attachment 56, at which left hydraulic cylinder 50 will be attached to the top 100 of box beam 16, may, preferably, be formed by welding parallel, spaced-apart clevis brackets 152 and 154 to top plate 100 as at 150.

According to the described construction of box beams, the side plates 96 and 98 and top plates 100 and 102 act together to provide structural strength against bending caused by force applied by cylinder 50 through attachment 56. Vertical struts 108, 110, 112, 114, 116, 118, 120 and 122 act to rigidify side plate 96, as well as top plates 100 and 102, against buckling. Similarly, vertical support struts 124, 126, 128, 130, 132, 134 and 136 are directly welded to side plate 98 to prevent side plate 98 from buckling. Also, the close spatial relationship with the vertical struts, even where they are not welded directly to more than one plate, acts to prevent the side plates and the top and bottom plates from buckling inward. Thus, by uniquely interdigitating the support struts, all of the exterior plates of the box beams are rigidified against buckling. With this construction, one box beam on either side of the frame adequately and advantageously provides strength sufficient for carrying a fully loaded hopper, and further for lifting the hopper in a pivoted fashion using side-mounted cylinders.

FIG. 5 is a side plan view of the hopper 14, according to one embodiment of the present invention. FIG. 6 is a front-end view of the hopper 14 of FIG. 5, and FIG. 7 is the rear-end view of the hopper 14 of FIG. 5. Hopper 14 is constructed with a top opening 20, defined by a rear edge 76, side edges 178 and 180 and front edge 182. Side walls 184 and 186, front wall 188 and rear wall 190 all angle inwardly toward a belly opening area 192. The back wall 190 is, preferably, at an angle of about 45° so that it forms an end-dumping chute for the hopper 14, which need not be pivoted very far beyond 90°, total pivoting, in order to provide an adequate discharge angle of about 45° for chute 190 when used in the end-dumping mode. When the hopper 14 is used in the belly-dumping mode, the 45° angle of the rear wall 190 is also adequately steep. The other walls 184, 186 and 188 are all at a substantially steeper angles than 45°, so that belly dumping is facilitated and sufficient carrying capacity is maintained.

The belly-dumping discharge area 192 is blocked with doors 194 and 196. These doors are constructed to be actuated to be opened or closed with left and right actuator arms 198 and 200 in the front and left and right actuator arms 202 and 204 in the rear. The actuator arms are actuated simultaneously using front cylinder 206 and rear cylinder 208, respectively. Arm 198 is pivoted at 210, arm 200 is pivoted at 212, arm 202 is pivoted at 214 and arm 204 is pivoted at 216. Each arm is securely affixed to one of the belly doors, so that arms 200 and 204 are affixed to belly door 196 and arms 198 and 202 are affixed to belly door 194. Further, advantageously, an adjustment mechanism or a timing mechanism, 218 at the front and 220 at the rear, are arranged to cause both doors 194 and 196 to be opened the same amount in each direction and/or to be closed the same amount in each direction, depending upon the actuation of cylinders 206 and 208. Cylinders 206 and 208 desirably act simultaneously in concert with each other, so that the front opening and the rear opening are consistently maintained. The doors are also uniquely constructed in an arc shape so that they may be smoothly opened about pivot points 210 and 214 with respect to door 194 and about an axis formed by pivot points 212 and 216 with respect to door 196. The arcuate shape of the doors corresponds to the double arcuate shape formed in front end plate 222 and rear end plate 224, so that the hopper 14 is maintained in a substantially closed condition without gaps being formed at either end. Because of the arc shape, the doors may still be moved to an opened position with a smooth pivoting rotation of each door and arm with respect to its respective pivot axes. The doors 194 and 196 are also uniquely constructed with a rigidifying, bracing structure, schematically depicted at 226 and 228 in FIG. 6. This rigidifying structure allows the doors to extend along the entire length of the hopper belly while carrying a heavy load over long distances and often over rough roads and terrain typical of construction sites where loading and dumping may be required.

It will also be observed that, advantageously, the pivot positions formed by pivots 210 and 214 and pivots 212 and 216 are positioned inward from the hopper side walls 184 and 186. Preferably, the pivots are inward a sufficient distance to be more than halfway toward the center from each respective side wall 184 and 186. Thus, the center of gravity of the mass of the load carried by each of the doors acts downward with a small horizontal lever arm to pivot each door inward. This holds doors 194 and 196 inward with respect to each other, when loaded, due to the weight of the mass being carried. In this fashion, relatively small hydraulic cylinders 206 and 208 may be advantageously used to slowly open the doors, thereby emptying a metered amount of material. This has been found to be preferable in many cases, over dumping an entire load instantaneously, as previously achieved with pneumatically actuated cylinders, which were typically actuated either fully closed or fully opened. Further, this provides an additional safety feature so that, when loaded, the doors hold themselves closed and force must be applied in order to open the doors.

Figure 8:
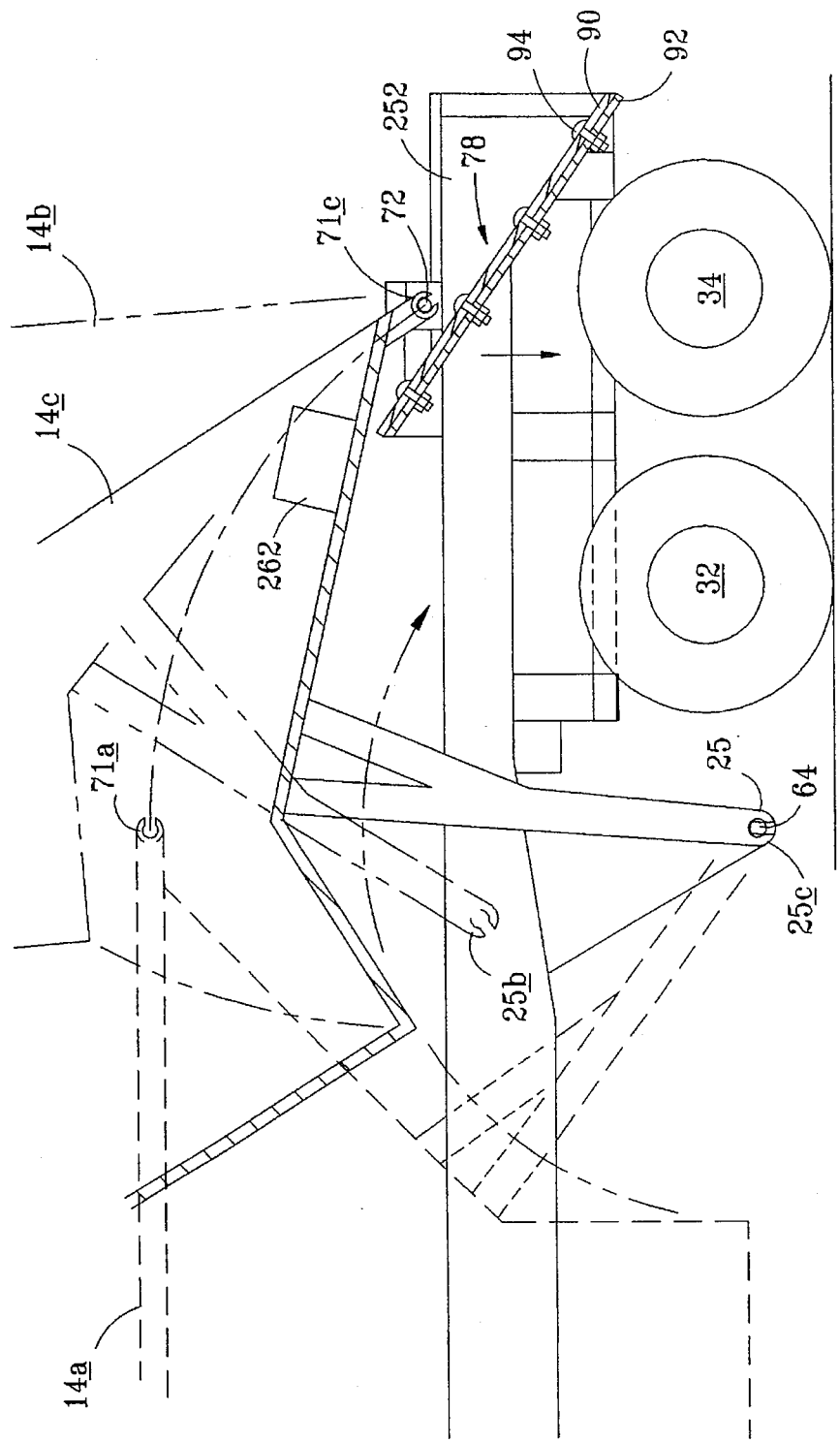
FIG. 8 is a schematic, partial detail, side cross-sectional view of the inventive dual use bottom and end dumping trailer according to the present invention, with the section line positioned as depicted at section 8—8 of FIG. 3, and further schematically depicting dual pivot point operation of the inventive trailer for end dumping from the hopper.

Referring now to FIG. 8, which is a partial cross-sectional view of the dumping trailer of FIG. 2, additional details of construction will be more fully understood. In FIG. 8, the initial horizontal transport position of the hopper 14 is depicted in phantom lines, with the hopper 14 depicted in solid cross-section at the transition point, and further depicted in full dumping position in phantom lines. Thus, three significant positions are thus schematically depicted. It will be noted that the cross-section shown is through the lower left pivot bar 64 and upper left pivot bar 72. Lower hopper socket 25 is shown in solid lines at transition point 25c, and upper hopper socket 71 is shown in solid lines at pivot transition position 71c. In this position, the lower pivot bar 64, in combination with socket 25, are designed to begin disengaging, and similarly, upper socket 71 is designed to initiate engagement with bar 72. The construction of the angled chute 78 with the preferred plastic low-friction lining 90, securely attached to base plate 92 using fasteners 94 is also depicted.

Figure 9:
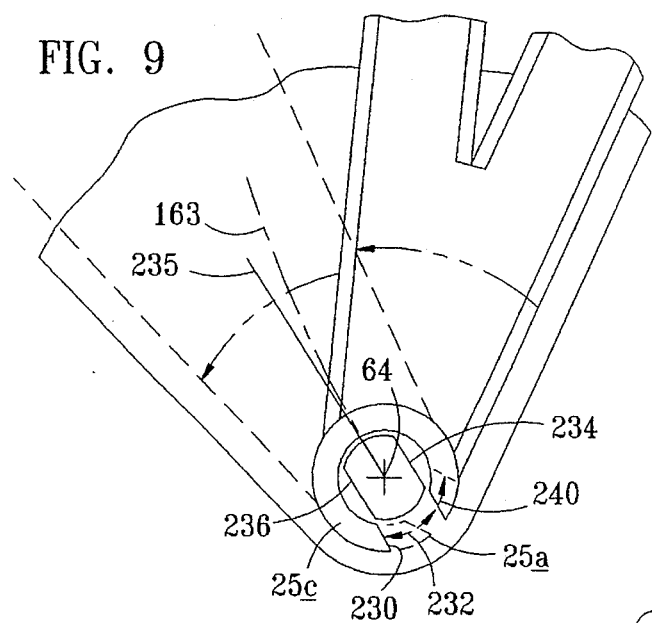
FIG. 9 is a schematic, enlarged, side view of a lower pivot pin mounted to the frame and uniquely constructed for disengageable pivoting with a lower pivot split collar socket mounted on the hopper.

With reference to FIG. 9, which is a detailed, partial view of lower pivot bar 64 and hopper pivot socket 25 (again, shown at the transition point with solid lines), the advantageous construction of a preferred embodiment can be more fully understood. Advantageously, pivot socket 75 has an opening 230 along a circular arc 232 which is less than 180°. Also, pivot bar 64 has surfaces 234 and 236, across which the dimensions of the bar are reduced. Preferably, surfaces 234 and 236 are parallel, flat surfaces, formed at an angle, corresponding substantially to a tangent 235 to an arc 163 formed with bar 72 as the center point. This tangent 235 to the arc 163, drawn from 72 as a center point, also substantially bisects the opening 230 so that upon engagement of socket 7 with upper pivot bar 72, socket 25 can move in an arcuate path 163 relative to bar 64, and bar 64 moves relatively outward through opening 230 without obstruction. The opening 230 is, preferably, less than 180°, and, preferably, corresponds in size to the reduced dimension of the bar 64, measured across its flat surfaces 234 and 236. Thus, when lower hopper socket 25 engages with bar 64 and is rotated as indicated at 240 relative to the bar 64, socket 25 becomes securely engaged with bar 64, and movement of the topper with respect to the bar is resisted and disengagement will not occur. Particularly with up and down motion, as might be expected due to bumping during transport, the socket 25 remains continuously engaged with and cannot escape from bar 64 unless it is both rotated so that flats 234 and 236 are aligned with opening 230 and then pivoted or moved angularly substantially parallel to the flats 234 and 236 in order to achieve disengagement. Thus, transitional pivoting is facilitated 25 while disengagement during transport is advantageously prevented.

Figure 10:
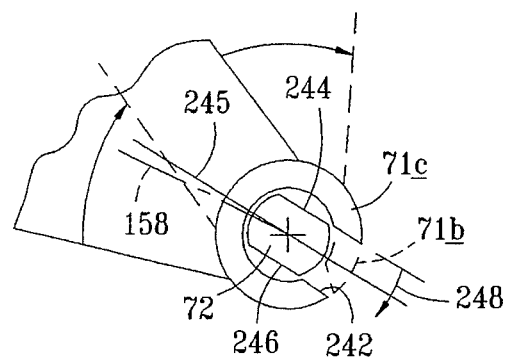
FIG. 10 is a schematic, side depiction of an upper pivot shaft mounted on the frame for secure pivotable engagement and disengagement with an upper split collar socket mounted on the hopper.

Referring to FIG. 10, a similar arrangement with socket 71, being designed to have an opening 244, which spans an arc of a cross-sectional circle around the socket 71 which is less than 180°, reduced dimension surfaces 244 and 246, preferably, flat surfaces for ease of manufacturing are formed on bar 72, which flats 244 and 246 are desirably parallel to a tangent 245 to an arc 158 formed by socket 71 when the hopper 14 is pivoted about lower pivot bar 64.

Thus, after a small amount of pivoting, schematically depicted at arrow 248, beyond the initial transitional pivot engagement point, socket 71 is held in pivotable engagement with bar 72, so that while the hopper is in an upward discharge position, disengagement with the upper pivot junctions is not permitted.

Figure 11:
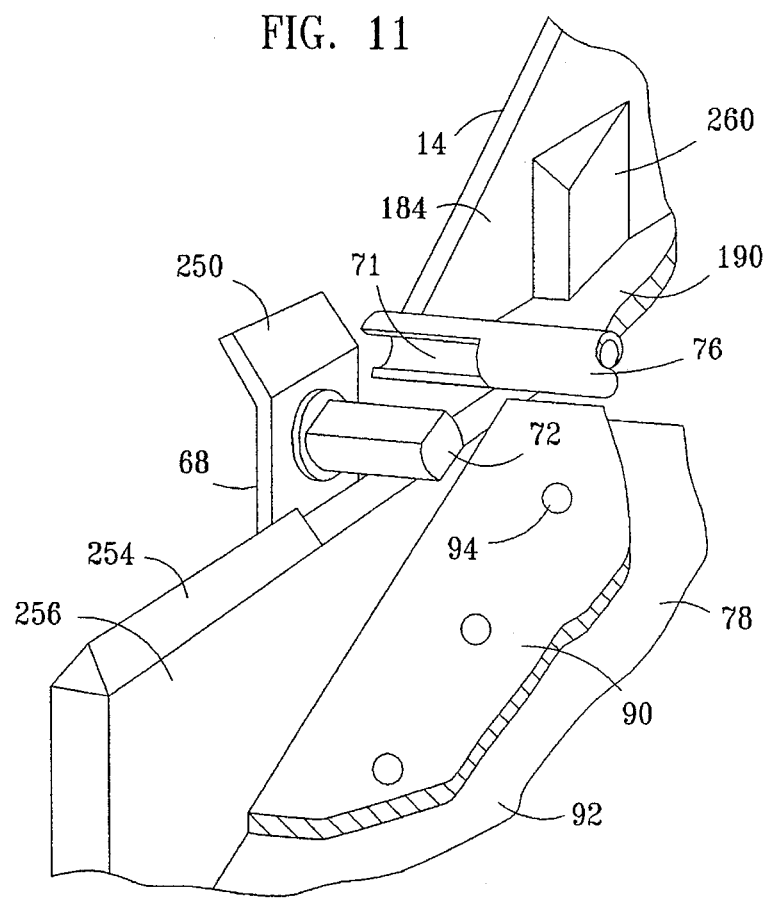
FIG. 11 is a partial, perspective view of one of the upper pivot shafts and corresponding upper pivot collar on the hopper, further depicting a guide baffle in the hopper, an upper pivot mount and guide block on the frame, and also depicting a portion of the rear-angled chute according to a preferred embodiment of the present invention.

Other advantageous features may be more fully understood with respect to FIG. 11, which is a partial, enlarged perspective view of upper pivot bar 72, upper pivot socket 71, shown attached above the angled chute 78, and also showing the support structure 68 for holding pivot bar 72. Further, a left material deflector 260 is shown in hopper 14 for facilitating smooth discharge of materials, particularly sticky materials, such as hot asphalt, from the hopper and down chute 78 without bunching. A corresponding right deflector 262 is provided on the inside of the other side of the hopper 14. Support structure 68 advantageously has an upwardly extending, angled guide surface 250, by which any initial, small misalignment between hopper socket 71 with pivot bar 72 will be directed along the slope of angled guide 250 back into pivotable engagement. As the distance between pivot socket 71 and lower pivot socket 25 is substantially fixed, the key dimension of concern for avoiding misalignment has been found to be the side-to-side direction which is corrected by angle surface 250 on the left side, attached to support 68. Thus, if all of the manufacturing tolerances and/or wear at the pivot connections is directed to one side, as where the vehicle is on a side incline, the angled support guide surface 250 acts to move the socket 71 back to an engagement position. A similar right side angled guide surface 252 (not shown) will also be attached to support 70 on the right side for guiding socket 73 into engagement with upper pivot bar 74.

The angled flat surfaces of pivot bars 64, 66, 72 and 74 all act to deflect any accumulation of debris. Also, in order to prevent accumulation of debris and material along the top surface 22 of beam 16, a tapered top surface 254 is provided along the rear chute wall 256.

Thus, what has been shown is an improved belly-dumping/end-dumping vehicle, and particularly a vehicle having improved end-dumping capabilities in which the hydraulic lifting cylinders are side-mounted and a rear-angled chute is provided to move materials beyond the end of the dumping trailer. The upper pivot points are located above and ahead of the rearmost wheel axle to provide better weight distribution, and each of the upper and lower pivot connections are constructed with bars on the vehicle, which bars will not normally accumulate any debris, and with sockets having c-shaped, cross-sectional openings for engaging bars having flats formed thereon in a manner which will facilitate secure, rotatable engagement, yet will permit successful transitional two-point hopper pivoting, which is advantageous for dual use, end-dumping and belly-dumping vehicles.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A dual use belly-dumping and end-dumping vehicle, comprising:
   (a) a frame, having left and right side beams connected together to form an opening therebetween, said frame mounted on wheels for transport;
   (b) a hopper with sides, ends and an openable bottom, said hopper carried in said opening between said left and right side beams in said frame;

(c) lower pivot elements mounted to said side beams on said frame;

(d) lower pivot engaging elements mounted on said hopper engageable with said lower pivot elements when said hopper is carried in said frame and so that said hopper is pivotable between a horizontal position and a first predetermined angled position;

(e) an upper pivot element mounted on said frame;

(f) an upper pivot engaging element mounted on said hopper for engaging said upper pivot element when said hopper is pivoted about said lower pivot element to said first predetermined angled position and, upon engagement between said upper pivot engaging element and said upper pivot, for pivoting said hopper about said upper pivot element to a second dumping angled position at an angle greater than said first predetermined angle; and (g) lifting cylinders mounted between the sides of said frame and the sides of said hopper for pivoting said hopper between a horizontally held position and said first and second angled positions for dumping materials from an end of said hopper.

2. A dual use belly-dumping and end-dumping vehicle, as in claim 1, wherein said side beams of said frame comprise a box beam construction for supporting said side-mounted cylinders.

3. A dual use belly-dumping and end-dumping vehicle, as in claim 1, wherein said lifting cylinders are mounted to a top surface of each side beam at a position between said ends of said hopper.

4. A dual use belly-dumping and end-dumping vehicle, as in claim 1, wherein said hydraulic cylinders comprise telescoping cylinders having five or fewer telescopic stages.

5. A dual use belly-dumping and end-dumping vehicle, as in claim 1, wherein said lower pivot elements comprise pivot bars attached through a lower pivot support to said frame and said lower pivot engaging elements comprise sockets attached to said hopper.

6. A dual use belly-dumping and end-dumping vehicle, comprising:

(a) a frame, having left and right side beams connected together to form an opening therebetween, said frame mounted on wheels for transport, wherein said side beams of said frame include a box beam construction for supporting said side-mounted cylinders and wherein said box beam construction further includes a plurality of spaced-apart internal rigidifying struts;

(b) a hopper with sides, ends and an openable bottom, said hopper carried in said opening between said left and right side beams in said frame;

(c) lower pivot elements mounted to said side beams on said frame;

(d) lower pivot engaging elements mounted on said hopper engageable with said lower pivot elements when said hopper is carried in said frame and so that said hopper is pivotable between a horizontal position and a first predetermined angled position;

(e) an upper pivot element mounted on said frame:

(f) an upper pivot engaging element mounted on said hopper for engaging said upper pivot element when said hopper is pivoted about said lower pivot element to said first predetermined angled position and, upon engagement between said upper pivot engaging element and said upper pivot, for pivoting said hopper about said upper pivot element to a second dumping angled position at an angle greater than said first predetermined angle; and (g) lifting cylinders mounted between the sides of said frame and the sides of said hopper for pivoting said hopper between a horizontally held position and said first and second angled positions for dumping materials from an end or said hopper.

7. A dual use belly-dumping and end-dumping vehicle, as in claim 6, wherein said plurality of spaced-apart internal rigidifying struts comprise a first set of spaced-apart struts welded at least to a first side of each box beam and a second set of spaced-apart struts welded to a second side of each box beam such that said spaced-apart struts of said first set of spaced-apart struts are interdigitatedly disposed with respect to said second set of spaced-apart struts.

8. A dual use belly-dumping and end-dumping vehicle, comprising:

(a) a frame, having left and right side beams connected together to form an opening therebetween, said frame mounted on wheels for transport;

(b) a hopper with sides, ends and an openable bottom, said hopper carried in said opening between said left and right side beams in said frame;

(c) lower pivot elements mounted to said side beams on said frame;

(d) lower pivot engaging elements mounted on said hopper engageable with said lower pivot elements when said hopper is carried in said frame and so that said hopper is pivotable between a horizontal position and a first predetermined angled position wherein said lower pivot elements comprise pivot bars attached through a lower pivot support to said frame and said lower pivot engaging elements include sockets attached to said hopper, and wherein said pivot bars further include opposed, parallel flat surfaces formed thereon at an angle and wherein said sockets comprise split-collar sockets having openings corresponding in size and orientation so that secure pivotable engagement results, except that said sockets are engageable over said flat surfaces when said hopper is pivoted about said upper pivot element;

(e) an upper pivot element mounted on said frame;

(f) an upper pivot engaging element mounted on said hopper for engaging said upper pivot element when said hopper is pivoted about said lower pivot element to said first predetermined angled position and, upon engagement between said upper pivot engaging element and said upper pivot, for pivoting said hopper about said upper pivot element to a second dumping angled position at an angle greater than said first predetermined angle; and (g) lifting cylinders mounted between the sides of said frame and the sides of said hopper for pivoting said hopper between a horizontally held position and said first and second angled positions for dumping materials from an end of said hopper.

9. A dual use dumping vehicle having belly-dumping and improved end-dumping capabilities, comprising:

(a) a frame with a front and with a rear end with a plurality of rear wheels, including rearmost wheels mounted to said rear end of said frame for rolling transport thereof;

(b) a hopper for transporting materials, said hopper supported in said frame for two stages of pivoting of said hopper with respect to said frame;

(c) a lower pivot attached to said frame for pivotably supporting said hopper during a first of said two stages of pivoting;

(d) an upper pivot attached to said frame for pivotably supporting said hopper during a second of said two stages of pivoting, during which second of said two stages of pivoting, materials in said hopper are dumped at said rear end of said frame, said upper pivot positioned on said frame forward of said rearmost wheels of said plurality of wheels; and (e) an angled dumping chute attached to said rear end of said frame for guiding materials dumped from said hopper past said rearmost wheels.

10. A dual use dumping trailer having belly-dumping and improved end-dumping capabilities, as in claim 9, further comprising:

(a) a frontmost rear axle with wheels thereon;

a rearmost rear axle with said rearmost wheels thereon; and (c) wherein said upper pivot is attached to said frame at a position a horizontal distance behind said frontmost rear axle and another horizontal distance ahead of said rearmost rear axle.

11. A dual use dumping trailer having belly-dumping and improved end-dumping capabilities, as in claim 9, with said chute further comprising a reduced-friction plastic liner.

12. A dual use dumping trailer having belly-dumping and improved end-dumping capabilities, as in claim 11, wherein said reduced friction liner comprises a replaceable liner attached with removable fasteners.

13. A dual use materials transport vehicle having belly-dumping and capability capabilities for dumping materials from an end, comprising:

(a) a frame with an end;

(b) a hopper, having an inside surface and pivotably mounted in said frame for dumping materials along said inside surface and out of said hopper at said end of said frame;

(c) a rear chute, having a central area and mounted on said end of said frame at an angle for directing dumped materials from said hopper downward at said end of said frame; and (d) opposed deflectors mounted on and along said inside surface for directing at least some of the dumped materials toward said central area of said chute so that smooth dumping of materials is facilitated.

14. A method of constructing a dual use materials transport vehicle having improved capabilities comprising the steps of:

forming a frame with left and right box beam rails, a front beam and at least one rear beam with an open space defined therebetween;

connecting a plurality of rear wheels to said frame;

providing a hopper with belly dumping capabilities and pivotably attaching said hopper within said opening of said frame; and (d) attaching left and right hydraulic cylinders between said left and right box beam rails, respectively, and said hopper for pivotably actuating said hopper between a transport position and an end dumping position.

15. A method of constructing a dual use materials transport vehicle having improved capabilities comprising the steps of:

(a) forming a frame with left and right box beam rails, a front beam and at least one rear beam with an open space defined therebetween wherein the step of forming a frame with left and right box beam rails further comprises the steps of:

(i) providing first and second side plates for each left and right box beam rail;

(ii) providing top and bottom plates for each left and right box beam rail;

(iii) providing a first and a second plurality of internal support struts;

(iv) welding said first plurality of support struts spaced apart at first intervals along said first side plate;

(v) welding said second plurality of support struts spaced apart at second intervals along said second side plate, which second intervals are alternatingly positioned with respect to said first intervals;

(vi) disposing said first and second side plates adjacent to each other with said first and second pluralities of support struts interdigitatedly disposed between said side plates; and (vii) welding said top plate and said bottom plate to both side plates along corners of said box beam rails;

(b) connecting a plurality of rear wheels to said frame;

(c) providing a hopper with belly dumping capabilities and pivotably attaching said hopper within said opening of said frame; and (d) attaching left and right hydraulic cylinders between said left and right box beam rails, respectively, and said hopper for pivotably actuating said hopper between a transport position and an end dumping position.

* * * * *

UNITED STATES PATENT AND TRADEMARK OFFICE
CERTIFICATE OF CORRECTION

PATENT NO. : 5,551,759

DATED : September 3, 1996

INVENTOR(S) : Gregg M. Hoss, et al.

It is certified that error appears in the above-identified patent and that said Letters Patent is hereby corrected as shown below:

Column 5, Line 50 --
    Replace: "to lower"
    With: -- to pivot the hopper 14 about lower --

Column 5, Line 51 --
    Delete: "the hopper 14 about pivot"

Column 5, Line 62 --
    Replace: "tear"
    With: -- rear --

Column 6, Line 27 --
    Replace: "FIGS. 3 and 7,"
    With: -- FIGS. 2, 3 and 7, --

Column 6, Line 32 --
    Replace: "are"
    With: -- arc --

Column 8, Line 5 --
    Replace: "where"
    With: -- when --

Column 11, Line 41 --
    Replace: "7"
    With: -- 71 --

UNITED STATES PATENT AND TRADEMARK OFFICE
CERTIFICATE OF CORRECTION

PATENT NO. : 5,551,759

DATED : September 3, 1996

INVENTOR(S) : Gregg M. Hoss, et al.

It is certified that error appears in the above-identified patent and that said Letters Patent is hereby corrected as shown below:

Column 11, Line 50 --
    Replace:     "topper"
    With:        -- hopper --

Column 11, Line 58 --
    Delete:      "25"

Column 14, Line 7 (Claims 6, Line 34) --
    Replace:     "or"
    With:        -- of --

Column 15, Line 29 (Claim 13, Line 2) --
    Replace:     "and capability"
    With:        -- capability and --

Column 16, Line 1 (Claim 14, Line 4) --
    Insert:       -- (a) -- [at beginning of line]

UNITED STATES PATENT AND TRADEMARK OFFICE
CERTIFICATE OF CORRECTION

PATENT NO. : 5,551,759

DATED : September 3, 1996

INVENTOR(S) : Gregg M. Hoss, et al.

It is certified that error appears in the above-identified patent and that said Letters Patent is hereby corrected as shown below:

Column 16, Line 4 (Claim 14, Line 7) --
    Insert: -- (b) -- [at beginning of line]

Column 16, Line 5 (Claim 14, Line 8) --
    Insert: -- (c) -- [at beginning of line]

Signed and Sealed this

Twenty-fifth Day of March, 1997

Attest:

BRUCE LEHMAN

Attesting Officer     *Commissioner of Patents and Trademarks*